United States Patent
Ogasawara

(10) Patent No.: US 8,380,403 B2
(45) Date of Patent: Feb. 19, 2013

(54) VEHICLE AND CONTROL METHOD THEREOF

(75) Inventor: Hideaki Ogasawara, Anjo (JP)

(73) Assignee: Aisin AW Co., Ltd., Aichi-ken (JP)

( * ) Notice: Subject to any disclaimer, the term of this patent is extended or adjusted under 35 U.S.C. 154(b) by 910 days.

(21) Appl. No.: 12/254,219

(22) Filed: Oct. 20, 2008

(65) Prior Publication Data

US 2009/0164075 A1    Jun. 25, 2009

(30) Foreign Application Priority Data

Dec. 19, 2007  (JP) ................. 2007-327882

(51) Int. Cl.
*F16H 35/00* (2006.01)
*F16H 59/00* (2006.01)
*B60W 10/10* (2006.01)
*B60W 10/06* (2006.01)
*G06F 7/00* (2006.01)
*G06F 17/00* (2006.01)

(52) U.S. Cl. ............... 701/54; 701/61; 701/66; 477/84; 477/111; 475/257

(58) Field of Classification Search ............... 701/51, 701/55, 58, 61–63, 66, 52, 53, 54, 56, 57, 701/64; 477/77, 78, 107, 110, 34, 70, 79, 477/80, 83, 84, 85, 108, 111; 475/158, 254, 475/256, 257

See application file for complete search history.

(56) References Cited

U.S. PATENT DOCUMENTS

| | | | |
|---|---|---|---|
| 5,103,692 A | 4/1992 | Shimanaka et al. |
| 5,669,849 A | 9/1997 | Tabata et al. |
| 6,835,151 B2 | 12/2004 | Fujimine et al. |

FOREIGN PATENT DOCUMENTS

| | | |
|---|---|---|
| CN | 200958552 Y | 10/2007 |
| DE | 4118736 A1 | 12/1991 |
| DE | 19603617 A1 | 8/1996 |
| JP | 09-014421 | 1/1997 |
| JP | 10-234106 | 9/1998 |
| JP | 2000-240785 | 9/2000 |
| JP | 2004-060731 | 2/2004 |
| JP | 2006-170116 | 6/2006 |

*Primary Examiner* — Thomas Tarcza
*Assistant Examiner* — Edward Pipala
(74) *Attorney, Agent, or Firm* — Sughrue Mion, PLLC

(57) ABSTRACT

A vehicle including an internal combustion engine and a stepped transmission including an input shaft and an output shaft, wherein the stepped transmission speed-changes power input to the input shaft while changing a shift speed and outputs the speed-changed power to the stepped transmission output shaft; a control unit that controls the engine and the stepped transmission in accordance with an output request from an operator. The vehicle also including input and output shaft rotation speed detecting units and an output limiting unit that limits the output of the engine by comparing the deviation of the input and output shaft rotation speed to a predetermined rotation speed relationship range. The vehicle also including an abnormality determining unit to determine that an abnormality has occurred in the stepped transmission when the rotation speed relationship exceeds the range of the predetermined rotation speed relationship for at least a first predetermined time period.

13 Claims, 5 Drawing Sheets

|  | CLUTCH | | | BRAKE | | | | ONE-WAY CLUTCH | | |
|---|---|---|---|---|---|---|---|---|---|---|
|  | C1 | C2 | C3 | B1 | B2 | B3 | B4 | F1 | F2 | F3 |
| P |  |  |  |  |  |  |  |  |  |  |
| REV |  |  | ○ | (○) |  |  | ○ | ○ |  |  |
| N |  |  |  |  |  |  |  |  |  |  |
| 1ST | ○ |  |  |  |  |  | (○) |  |  | ○ |
| 2ND | ○ |  |  |  | (○) | ○ |  |  | ○ | ○ |
| 3RD | ○ |  | ○ | (○) |  | ● |  |  | ○ |  |
| 4TH | ○ | ○ | ● |  |  | ● |  |  |  |  |
| 5TH |  | ○ | ○ | ○ |  | ● |  |  |  |  |

(○) INDICATES ENGINE BRAKING, ● INDICATES ENGAGEMENT BUT NO TORQUE TRANSMISSION

VEHICLE AND CONTROL METHOD THEREOF

CROSS REFERENCE TO RELATED APPLICATIONS

This Application claims priority from Japanese Patent Application No. 2007-327882 filed on Dec. 19, 2007, the disclosure of which, including the specification, drawings and abstract, is incorporated herein by reference in its entirety.

BACKGROUND

1. Field of the Invention

Apparatuses and methods consistent with the present invention relate to a vehicle and a control method thereof, and more particularly to a vehicle including an internal combustion engine, a stepped transmission that has an input shaft connected to an output shaft of the internal combustion engine and the output shaft connected to an axle side, wherein the stepped transmission is capable of speed-changing power input to the input shaft while changing shift speed and outputting the speed-changed power to the output shaft, and a control unit that controls the internal combustion engine and the stepped transmission such that the vehicle is caused to travel in accordance with power based on an output request from an operator, and a control method for the vehicle.

2. Description of the Related Art

A vehicle having an automatic transmission that is driven by a hydraulic control device that changes the speed of power from an engine and outputs the speed-changed power has been proposed in the related art (see, for example, Japanese Patent Application Publication No. JP-A-2004-36673).

Incidentally, when the related art transmission enters a neutral state due to an abnormality in the hydraulic control device, racing occurs in an input shaft of the transmission due to torque from the engine, and therefore an abnormality in the transmission can be determined by comparing a ratio between the rotation speed on the output side of the transmission and the rotation speed on the input side using a subject reduction ratio. To prevent erroneous determinations, the existence of an abnormality in the transmission is usually confirmed when rotation of the input shaft continues for a predetermined time period or longer, but depending on the degree of rotation in the input shaft, a rotary body (a planetary gear mechanism) of the transmission may over-rotate beyond its tolerance. A durable rotary body may be provided in response to such cases, but this results in increased weight and the overall size of the transmission.

SUMMARY

Exemplary embodiments of the present invention resolve such shortcomings and other shortcomings not described above. Also, the present invention is not required to overcome the shortcomings described above, and exemplary embodiments of the present invention may not overcome any of the problems described above.

One aspect of the vehicle and control method thereof according to the present invention is to determine an abnormality in a stepped transmission more appropriately.

According to one aspect of the present invention a vehicle includes an internal combustion engine; a stepped transmission that has an input shaft connected to an output shaft of the internal combustion engine and an output shaft connected to an axle side and is capable of speed-changing a power input to the input shaft while changing shift speed and outputting the speed-changed power to the output shaft; a control unit that controls the internal combustion engine and the stepped transmission such that the vehicle is caused to travel in accordance with power based on an output request from an operator; an input shaft rotation speed detecting unit that detects an input shaft rotation speed; an output shaft rotation speed detecting unit that detects an output shaft rotation speed; an output limiting unit which, when a rotation speed relationship between the detected input shaft rotation speed and the detected output shaft rotation speed exceeds a range of a predetermined rotation speed relationship for determining an abnormality in the stepped transmission, limits the output of the internal combustion engine relative to the output request to a range in which the rotation speed relationship exceeds the range of the predetermined rotation speed relationship and the rotation speed of the input shaft does not exceed a predetermined upper limit rotation speed; and an abnormality determining unit which determines that an abnormality has occurred in the stepped transmission when the rotation speed relationship exceeds the range of the predetermined rotation speed relationship for at least a first predetermined time period.

In another aspect of the present invention, when the rotation speed relationship between the input shaft rotation speed, and the output shaft rotation speed, exceeds the range of the predetermined rotation speed relationship for determining an abnormality in the stepped transmission, the output of the internal combustion engine is limited relative to the output request to a range in which the rotation speed relationship exceeds the range of the predetermined rotation speed relationship and the rotation speed of the input shaft does not exceed the predetermined upper limit rotation speed, and when the rotation speed relationship exceeds the range of the predetermined rotation speed relationship for at least the first predetermined time period, an abnormality is determined to have occurred in the stepped transmission. Hence, the existence of an abnormality in the stepped transmission can be determined appropriately on the basis of the rotation speed relationship while preventing secondary problems in the stepped transmission caused by rotation of the input shaft. Furthermore, in one aspect of the present invention the "abnormality determining unit" may also be used as a unit that determines the existence of an abnormality in an actuator for driving the stepped transmission.

Another aspect of the present invention, the output limiting unit may be used as a unit that begins output limitation of the internal combustion engine when, as a case in which the rotation speed relationship exceeds the predetermined rotation speed relationship, a deviation between the detected input shaft rotation speed and a value obtained by multiplying a reduction ratio of a subject shift speed by the detected output shaft rotation speed, having reached or exceeded a first predetermined value, reaches or exceeds a second predetermined value that is greater than the first predetermined value, and releases the output limitation on the internal combustion engine when the deviation falls below a third predetermined value, wherein the third predetermined value is smaller than the second predetermined value and larger than the first predetermined value. In this aspect of the present invention, the abnormality determining unit may be used as a unit that determines that an abnormality has occurred in the stepped transmission when the deviation remains equal to, or greater than, the first predetermined value for at least the first predetermined time period. Thus, secondary problems in the stepped transmission caused by rotation of the input shaft can be prevented by means of simple processing. In at least this aspect of the present invention, "output limitation" includes limitation to 0 torque and limitation to negative torque. In this case, the output limiting unit may be used as a unit that begins the output limitation of the internal combustion engine when the deviation remains equal to or greater than the second predetermined value for at least a second predetermined time period, which is shorter than the first predetermined time period. Thus, excessive output limitation of the motor may be suppressed.

Further, in another aspect of the present invention, the output limiting unit may set an upper limit torque of the internal combustion engine, and the control unit may control the internal combustion engine such that a requested torque, serving as the output request of the operator, is output from the internal combustion engine within a range of the set upper limit torque.

A control method for a vehicle such as in accordance with one aspect of the present invention for a vehicle such as the one described above includes: when a rotation speed relationship between an input shaft rotation speed, and an output shaft rotation speed, exceeds a range of a predetermined rotation speed relationship for determining an abnormality in the stepped transmission, limiting an output of the internal combustion engine relative to the output request to a range in which the rotation speed relationship exceeds the range of the predetermined rotation speed relationship and the rotation speed of the input shaft does not exceed a predetermined upper limit rotation speed; and determining that an abnormality has occurred in the stepped transmission when the rotation speed relationship exceeds the range of the predetermined rotation speed relationship for at least a first predetermined time period.

According to another aspect of the control method for the vehicle of the present invention, when a rotation speed relationship between the input shaft rotation speed, and the output shaft rotation speed, exceeds the range of the predetermined rotation speed relationship for determining an abnormality in the stepped transmission, the output of the internal combustion engine is limited relative to the output request to a range in which the rotation speed relationship exceeds the range of the predetermined rotation speed relationship and the input shaft rotation speed does not exceed the predetermined upper limit rotation speed, and when the rotation speed relationship exceeds the range of the predetermined rotation speed relationship for at least the first predetermined time period, an abnormality is determined to have occurred in the stepped transmission. Hence, the existence of an abnormality in the stepped transmission can be determined appropriately on the basis of the rotation speed relationship while preventing secondary problems in the stepped transmission caused by rotation of the input shaft.

BRIEF DESCRIPTION OF THE DRAWINGS

The aspects of the present invention will become more apparent by describing in detail exemplary embodiments thereof with reference to the accompanying drawings, in which.

DETAILED DESCRIPTION OF EXEMPLARY EMBODIMENTS

The invention will now be described herein with reference to illustrative exemplary embodiments. Those skilled in the art will recognize that many alternative embodiments can be accomplished using the teachings of the present invention and that the invention is not limited to the exemplary embodiments described below. Like reference numbers will denote like elements.

Figure 1:
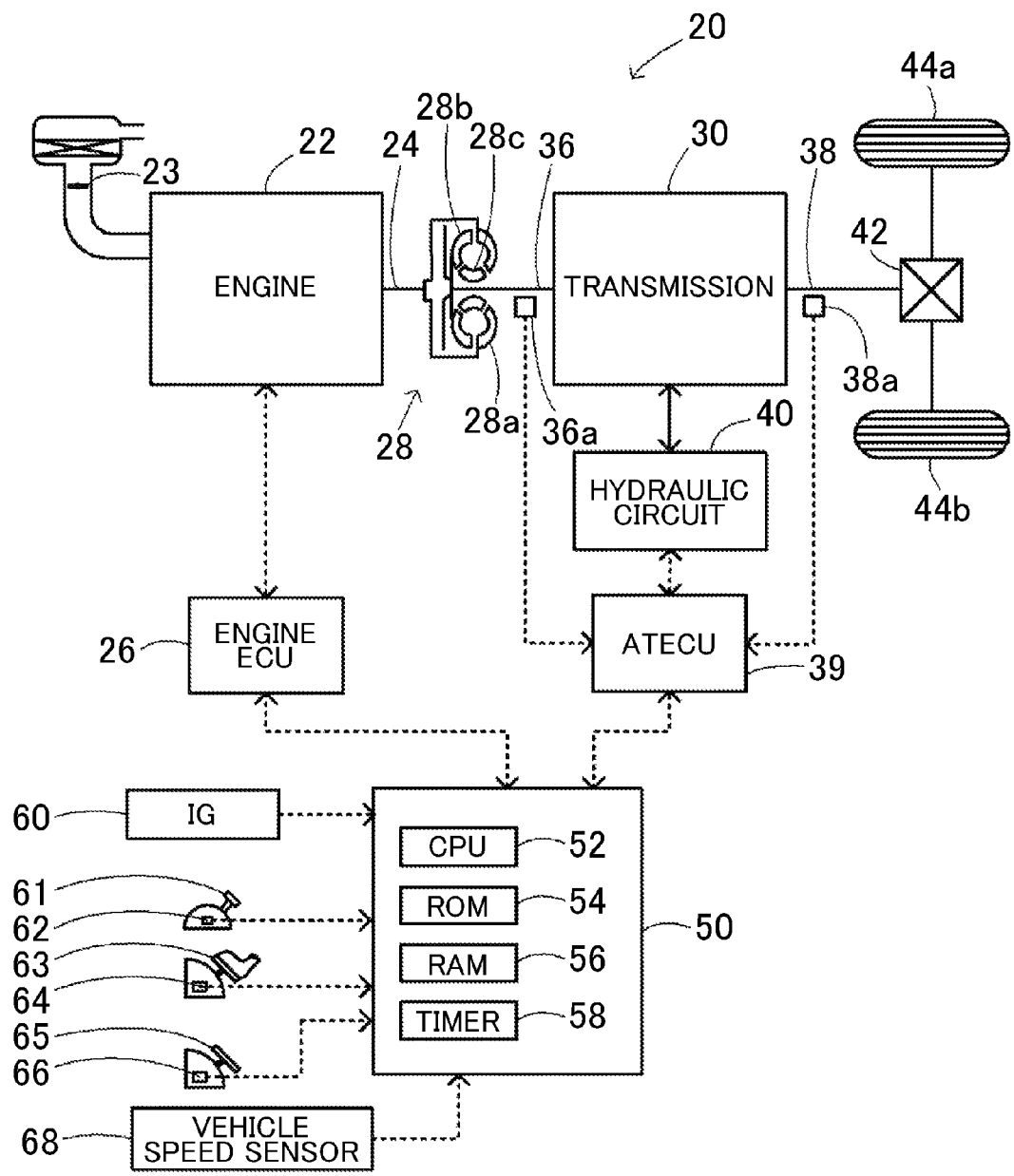
FIG. 1 is a structural diagram showing an outline of the structure of an automobile 20 in accordance with an exemplary embodiment of the present invention.

FIG. 1 is a structural diagram showing an outline of the structure of an automobile 20 in accordance with one exemplary embodiment of the present invention. As shown in FIG. 1, the automobile 20 according to this exemplary embodiment includes an engine 22, serving as an internal combustion engine that outputs power through explosive combustion of a hydrocarbon-based fuel such as gasoline or light oil, a torque converter 28 attached to a crankshaft 24 of the engine 22, a stepped transmission 30 having an input shaft 36 connected to an output side of the torque converter 28 and an output shaft 38 connected to drive wheels 44a, 44b via a differential gear 42, where in the stepped transmission 30 speed-changes power input to the input shaft 36 and transmits the speed-changed power to the output shaft 38, and a vehicle electronic control unit 50 that controls the entire vehicle.

In accordance with one exemplary embodiment, the engine 22 outputs power upon reception of: intake air amount adjustment control for controlling a throttle motor for driving a throttle valve 23 such that required air intake is performed on the basis of an accelerator opening by an engine electronic control unit (engine ECU hereafter) 26 that inputs detection values from various sensors required to control an operation of the engine 22, such as, for example, a crank position sensor attached to the crankshaft 24; fuel injection control for controlling a fuel injection valve such that fuel is injected in a required amount corresponding to the intake air amount; ignition control for controlling ignition timing of the spark plug, and so on.

In one exemplary embodiment, the torque converter 28 includes a pump impeller 28a connected to the crankshaft 24 of the engine 22, a turbine runner 28b connected to the input shaft 36 of the transmission 30, and a stator 28c interposed between the pump impeller 28a and the turbine runner 28b, wherein the torque converter 28 transmits power from the crankshaft 24 of the engine 22 to the input shaft 36 of the transmission 30 while amplifying torque using oil filled into the interior thereof.

Figures 2, 3:
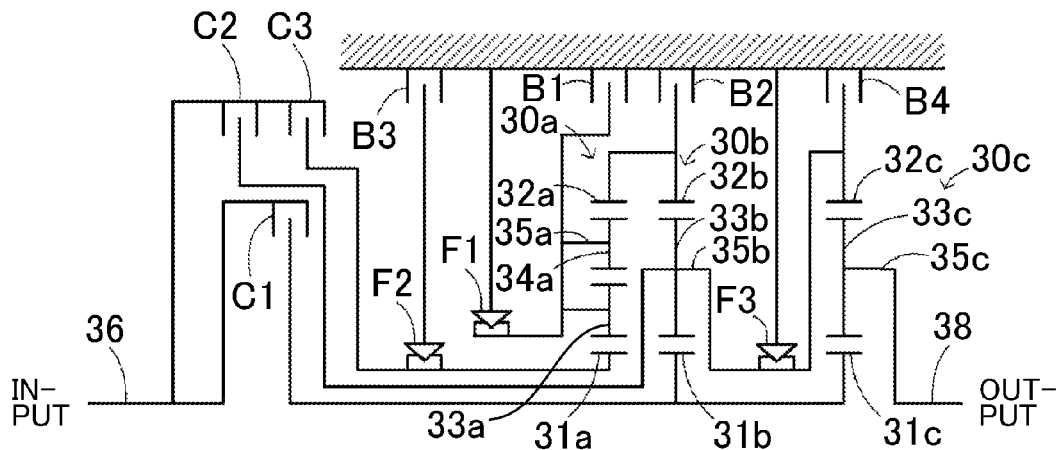
FIG. 2 is a structural diagram showing an outline of the structure of a transmission 30 in accordance with one exemplary embodiment of the present invention.
FIG. 3 is an illustrative view showing an operation table of the transmission 30 in accordance with one exemplary embodiment of the present invention.

FIG. 2 is an outline of the structure of a transmission 30 in accordance with one exemplary embodiment. As shown in FIGS. 1 and 2, the transmission 30 is structured by a five-speed stepped transmission driven using oil pressure from a hydraulic circuit 40, and includes a double-pinion type planetary gear mechanism 30a, two single-pinion type planetary gear mechanisms 30b, 30c, three clutches C1, C2, C3, four brakes B1, B2, B3, B4, and three one-way clutches F1, F2, F3. The double-pinion type planetary gear mechanism 30a includes a sun gear 31a serving as an external gear, a ring gear 32a serving as an internal gear disposed concentrically with the sun gear 31a, a plurality of first pinion gears 33a that mesh with the sun gear 31a, a plurality of second pinion gears 34a that mesh with the first pinion gears 33a and the ring gear 32a, and a carrier 35a that connects the plurality of first pinion gears 33a to the plurality of second pinion gears 34a and carries the first and second pinion gears 33a, 34a so as to allow these gears freedom to spin and revolve. The sun gear 31a is connected to the input shaft 36 via the clutch C3, and rotation thereof can be permitted freely or limited to a single direction by switching the brake B3, which is connected thereto via the one-way clutch F2, to ON or OFF. Rotation of the ring gear 32a can be permitted or fixed by switching the brake B2 ON and OFF, and rotation of the carrier 35a can be limited to a single direction by the one-way clutch F1 and permitted or fixed by switching the brake B1 ON and OFF.

The single-pinion type planetary gear mechanism 30b includes a sun gear 31b serving as an external gear, a ring gear 32b serving as an internal gear disposed concentrically with the sun gear 31b, a plurality of pinion gears 33b that mesh with the sun gear 31b and the ring gear 32b, and a carrier 35b that carries the plurality of pinion gears 33b so as to allow these gears freedom to spin and revolve. The sun gear 31b is connected to the input shaft 36 via the clutch C1. The ring gear 32b is connected to the ring gear 32a of the double-pinion type planetary gear mechanism 30a, and rotation thereof can be permitted or fixed by switching the brake B2 ON and OFF. The carrier 35b is connected to the input shaft 36 via the clutch C2, and rotation thereof can be limited to a single direction by the one-way clutch F3.

The single-pinion type planetary gear mechanism 30c also includes a sun gear 31c serving as an external gear, a ring gear 32c serving as an internal gear disposed concentrically with the sun gear 31c, a plurality of pinion gears 33c that mesh with the sun gear 31c and the ring gear 32c, and a carrier 35c that carries the plurality of pinion gears 33c so as to allow these gears freedom to spin and revolve. The sun gear 31c is connected to the sun gear 31b of the single-pinion type planetary gear mechanism 30b. The ring gear 32c is connected to the carrier 35b of the single-pinion type planetary gear mechanism 30b, and rotation thereof can be permitted or fixed by switching the brake B4 ON and OFF. The carrier 35c is connected to the output shaft 38.

As shown in the operation table in FIG. 3, in at least one exemplary embodiment the transmission 30 is capable of switching between first through fifth forward speeds, reverse, and neutral by switching the clutches C1 to C3 and the brakes B1 to B4 between ON and OFF. The first forward speed, or more specifically first state in which the rotation of the input shaft 36 is reduced by a maximum reduction ratio and then transmitted to the output shaft 38, can be achieved by switching the clutch C1 ON and switching clutches C2 and C3 and brakes B1 to B4 OFF. In this state, the rotation of the ring gear 32c of the single-pinion planetary gear mechanism 30c is limited to a single direction (forward direction rotation is fixed) by the one-way clutch F3, and therefore power input from the input shaft 36 into the sun gear 31c via the clutch C1 is reduced by a large reduction ratio and output to the carrier 35c, or in other words the output shaft 38. During engine braking in the first speed, the rotation of the ring gear 32c is fixed by switching the brake B4 ON instead of using the one-way clutch F3 as shown in FIG. 3.

As shown in FIG. 3, the second forward speed can be achieved by switching the clutch C1 and the brake B3 ON and switching clutches C2, C3 and brakes B1, B2, B4 OFF. In this state, the rotation of the sun gear 31a of the double-pinion planetary gear mechanism 30a is limited to a single direction (forward direction rotation is fixed) by the one-way clutch F2, and rotation of the carrier 35a is limited to a single direction (forward direction rotation is fixed) by the one-way clutch F1. Accordingly, rotation of the ring gear 32a and the ring gear 32b of the single-pinion type planetary gear mechanism 30b is also limited to a single direction (forward direction rotation is fixed), and therefore power input from the input shaft 36 into the sun gear 31b via the clutch C1 is reduced, due to the ring gear 32b being fixed, and output to the carrier 35b and the ring gear 32c of the single-pinion planetary gear mechanism 30c, while power input from the input shaft 36 into the sun gear 31c via the clutch C1 is reduced by a slightly smaller reduction ratio than that of the first forward speed in accordance with the rotary state of the ring gear 32c and output to the carrier 35c, or in other words the output shaft 38. During engine braking in the second speed, rotation of the ring gear 30a and the ring gear 30b is fixed by switching the brake B2 ON instead of using the one-way clutch F1 and the one-way clutch F2.

Next, as shown in FIG. 3, the third forward speed can be achieved by switching clutches C1, C3 and brake B3 ON and switching clutch C2 and brakes B1, B2, B4 OFF. In this state, the rotation of the carrier 35a of the double-pinion planetary gear mechanism 30a is limited to a single direction (forward direction rotation is fixed) by the one-way clutch F1. Therefore, power input from the input shaft 36 into the sun gear 31a via the clutch C3 is reduced and output to ring gear 32a as well as ring gear 32b of the single-pinion planetary gear mechanism 30b, power input from the input shaft 36 into the sun gear 31b via the clutch C1 is reduced in accordance with the rotary state of the ring gear 32b and output to carrier 35b as well as ring gear 32c of the single-pinion planetary gear mechanism 30c, and power input from the input shaft 36 into the sun gear 31c via the clutch C1 is reduced by a slightly smaller reduction ratio than that of the second forward speed in accordance with the rotary state of the ring gear 32c and output to the carrier 35c, or in other words the output shaft 38. Furthermore, during engine braking in the third speed, the rotation of the carrier 35a is fixed by switching the brake B1 ON instead of using the one-way clutch F1.

The fourth forward speed can be achieved by switching clutches C1 to C3 and brake B3 ON and switching brakes B1, B2, and B4 to OFF. In this state, the input shaft 36 is connected to the sun gear 31b of the single-pinion planetary gear mechanism 30b and the sun gear 31c of the single-pinion planetary gear mechanism 30c via clutch C1, and connected to carrier 35b and ring gear 32c via clutch C2, and therefore all of the rotary elements of the single-pinion planetary gear mechanisms 30b, 30c rotate integrally such that the input shaft 36 and the output shaft 38 are directly connected. Accordingly, the power input from the input shaft 36 is transmitted at a reduction ratio of 1.0.

The fifth forward speed, or in other words a state in which the rotation of the input shaft 36 is reduced (increased) by a minimum reduction ratio and then transmitted to the output shaft 38, can be formed by switching clutches C2, C3 and brakes B1, B3 to ON and switching clutch C1 and brakes B2, B4 to OFF such that the rotation of the carrier 35a of the double-pinion planetary gear mechanism 30a is limited to a single direction (forward direction rotation is fixed) by the one-way clutch F1. As a result, power input from the input shaft 36 into sun gear 31a via clutch C3 is reduced and then output to ring gear 32a and ring gear 32b of the single-pinion planetary gear mechanism 30b, power input from the input shaft 36 into the carrier 35b via the clutch C2 is increased in accordance with the rotary state of the ring gear 32b and then output to sun gear 31b and sun gear 31c of the single-pinion planetary gear mechanism 30c, and power input from the input shaft 36 into ring gear 32c via clutch C2 is increased by the minimum reduction ratio in accordance with the rotary state of sun gear 31c and then output to carrier 35c, or in other words the output shaft 38. As is evident from the exemplary embodiment illustrated in operation table in FIG. 3, swapping of the clutches C1 to C3 and brakes B1 to B4 does not occur in the transmission 30 during shifts in the first through fourth speeds, but during a shift between the fourth speed and fifth speed, swapping occurs between clutch C1 and brake B1.

Further, the neutral state of the transmission 30, or in other words, a state in which the input shaft 36 and the output shaft 38 are disconnected, can be achieved by switching clutches C1 to C3 and brakes B1 to B4 OFF, while the reverse state can be achieved by switching clutch C3 and brake B4 ON and switching clutches C1, C2 and brakes B1 to B3 OFF. In this state, rotation of the carrier 35a of the double-pinion planetary gear mechanism 30a is limited to a single direction (forward direction rotation is fixed) by the one-way clutch F1, and therefore power input from the input shaft 36 into sun gear 31a via clutch C3 is reduced and output to ring gear 32a and ring gear 32b of the single-pinion planetary gear mechanism 30b. Further, rotation of carrier 35b of the single-pinion planetary gear mechanism 30b and ring gear 32c of the single-pinion planetary gear mechanism 30c is fixed by brake B4, and therefore the power output to the ring gear 32a is rotationally reversed and output to carrier 35c, or in other words the output shaft 38. During engine braking in the reverse state, rotation of the carrier 35a is fixed by switching the brake B1 ON instead of using the one-way clutch F1.

In one exemplary embodiment, the transmission 30 is driven by drive-controlling various solenoids provided in the hydraulic circuit 40 using an automatic transmission electronic control unit (ATECU hereafter) 39. A turbine rotation speed Ntur from a rotation speed sensor 36a attached to the input shaft 36 of the transmission 30, or in other words the turbine runner 28b side of the torque converter 28, an output shaft rotation speed Nout from a rotation speed sensor 38a attached to the output shaft 38 of the transmission 30, are input into the ATECU 39.

In one exemplary embodiment, the vehicle electronic control unit 50 includes a microprocessor that centers on a CPU 52 and includes, in addition to the CPU 52, a ROM 54 storing a processing program, a RAM 56 for storing data temporarily, a timer 58 for measuring time, and input/output ports and a communication port. An ignition signal from an ignition switch 60, a shift position SP from a shift position sensor 62 for detecting an operating position of a shift lever 61, an accelerator opening Acc from an accelerator pedal position sensor 64 for detecting a depression amount of an accelerator pedal 63, a brake position BP from a brake pedal position sensor 66 for detecting a depression amount of a brake pedal 65, a vehicle speed V from a vehicle speed sensor 68, and so on are input into the vehicle electronic control unit 50 via an input port. The vehicle electronic control unit 50 is connected to the engine ECU 26 and the ATECU 39 via the communication port, and exchanges various control signals and data with the engine ECU 26 and ATECU 39.

Figure 4:
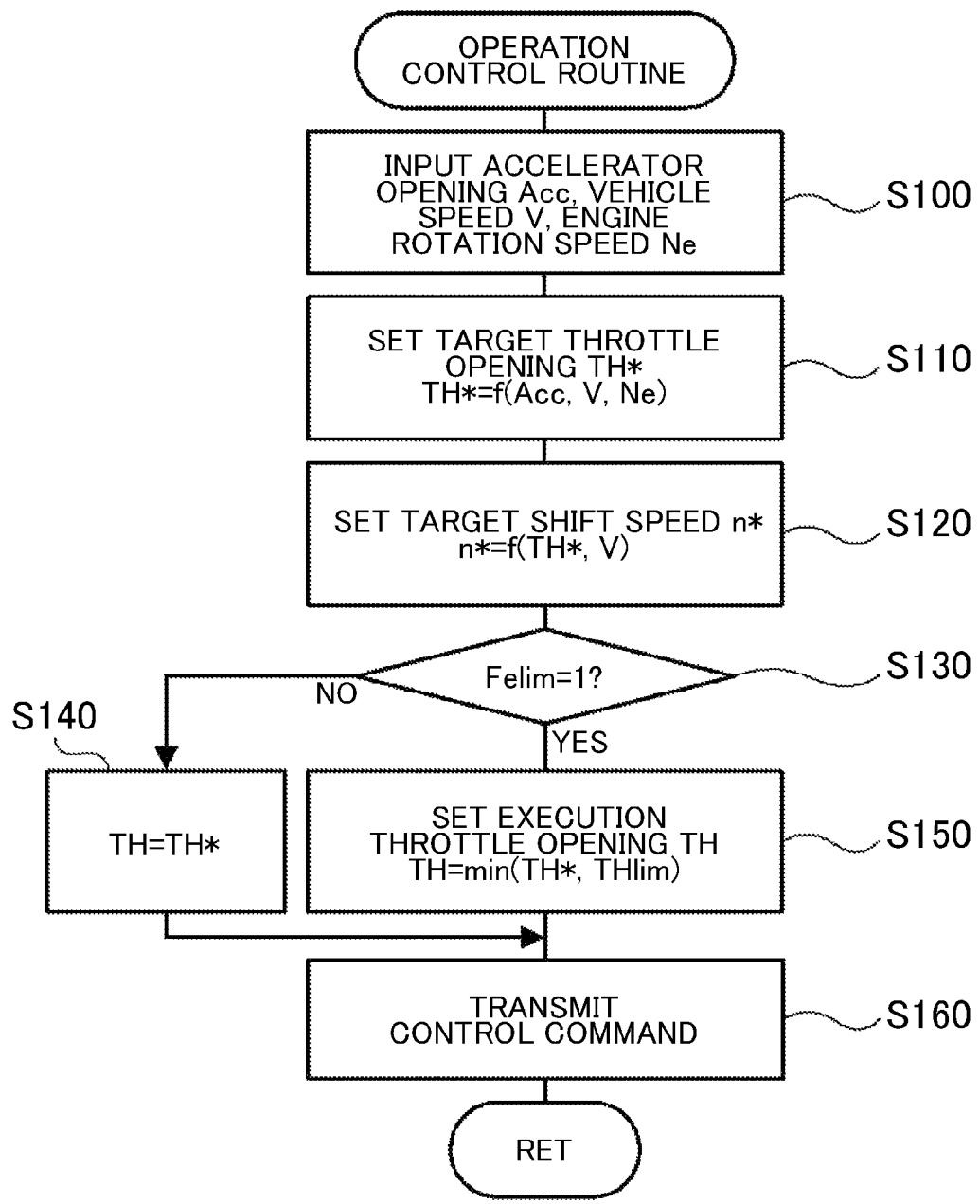
FIG. 4 is a flowchart showing an example of an operation control routine executed by a vehicle electronic control unit 50.

Next, an operation of the automobile 20 according to one exemplary embodiment, and in particular an operation performed to determine the existence of an abnormality in the transmission 30, will be described. For convenience, operation control of the automobile 20 will be described first, followed by processing for determining the existence of an abnormality in the transmission 30. FIG. 4 is a flowchart showing an example of an operation control routine executed by the vehicle electronic control unit 50. In one exemplary embodiment, this routine is executed repeatedly at predetermined time intervals.

Upon execution of the operation control routine, first, the CPU 52 of the vehicle electronic control unit 50 inputs data required for the control, such as, for example the accelerator opening Acc from the accelerator pedal position sensor 66, the vehicle speed V from the vehicle speed sensor 68, a rotation speed Ne of the engine 22, (S100). Here, the rotation speed Ne of the engine 22 is obtained by inputting, a value calculated by the engine ECU 26 on the basis of a crank angle from a crank position sensor, attached to the crankshaft 24.

Once these data have been input, a target throttle opening TH* of the engine 22 is set on the basis of the input accelerator opening Acc, vehicle speed V, and rotation speed Ne of the engine 22 (S110). In this embodiment, the target throttle opening TH* is set by determining relationships between the accelerator opening Acc, the vehicle speed V, the rotation speed Ne of the engine 22, and the target throttle opening TH* in advance, storing these relationships in ROM 54 in the form of a map, and deriving a corresponding target throttle opening TH* from the map after obtaining the accelerator opening Acc, the vehicle speed V, and the rotation speed Ne of the engine 22. Once the target throttle opening TH* has been set, a target shift speed n* is set on the basis of the set target throttle opening TH*, the vehicle speed V, and a preset shift map (S120).

Next, the value of an output limitation flag Felim of the engine 22 is checked (S130). The output limitation flag Felim is used to limit torque output from the engine 22, and is employed by inputting a value set in an abnormality determination processing routine to be described below. When the value of the output limitation flag Felim is 0, it is determined that there is no need to limit the torque output from the engine 22, and the target throttle opening TH* set in operation S110 is set as an execution throttle opening TH (S140). When the value of the output limitation flag Felim is 1, it is determined that the torque output from the engine 1 is to be limited, and the smaller of the target throttle opening TH* set in operation S110 and a limit value THlim is set as the execution throttle opening TH (S150). Here, the limit value THlim defines an upper limit of the throttle opening (engine torque) to be limited in order to suppress (rotation increase in the input shaft 36 turbine runner 28b) of the transmission 30, and is set in this embodiment such that the torque takes a value of 0. Needless to say, slight torque output may be permitted as long as increased rotation of the input shaft 36 can be suppressed, and the output torque may also be limited to negative torque, regardless of the target throttle opening TH*.

Once the execution throttle opening TH and the target shift speed n* have been set in this manner, the execution throttle opening TH is transmitted to the engine ECU 26 and the target shift speed n* is transmitted to the ATECU 39 (S160), whereupon the routine is terminated. Having received the execution throttle opening TH, the engine ECU 26 drive-controls a throttle motor at the execution throttle opening TH, controls the fuel injection valve to inject fuel on the basis of the intake air amount, and controls the spark plug to ignite at a predetermined timing. Upon reception of the target shift speed n*, the ATECU 39 controls the solenoids of the hydraulic circuit 40 such that the shift speed of the transmission 30 matches the target shift speed n*.

Next, an abnormality determination processing routine shown in FIG. 5, for determining the existence of an abnormality in the solenoids of the hydraulic circuit 40 in accordance with one exemplary embodiment will be described. In the abnormality determination processing routine of FIG. 5, the CPU 52 of the vehicle electronic control unit 50 first inputs data such as the accelerator opening Acc, the vehicle speed V, the turbine rotation speed Ntur, and the output shaft rotation speed Nout (S200). Here, the turbine rotation speed Ntur and the output shaft rotation speed Nout are obtained by inputting values obtained by the respective rotation speed sensors 36a, 38a from ATECU 39.

Once this data has been input, thresholds Nref1, Nref2 and Nref 3 for determining the state of the transmission 30 are calculated using Equations (1), (2) and (3), respectively, as set forth below (S210). Here, a reduction ratio γset in Equations (1) through (3) indicates the reduction ratio of the fourth forward speed (1.0 in this embodiment), while a predetermined rotation speed Na in Equation (1), a predetermined rotation speed Nb in Equation (2), and a predetermined rotation speed Nc in Equation (3) are set to, for example, 500 rpm, 1500 rpm, and 1250 rpm, respectively, such that a relationship of Nb>Nc>Na is established. As noted above, swapping occurs between the clutch C1 and the brake B1 during a shift between the fourth speed and fifth speed, and therefore, when an abnormality (for example, an abnormality such as disconnection of the solenoid or valve sticking of the solenoid valve) occurs in the hydraulic circuit 40 of the transmission 30 during shifting between the fourth speed and fifth speed, the input shaft 36 and output shaft 38 become disconnected (i.e. enter the neutral state). Hence, threshold Nref1 is used to determine this state. The threshold Nref2 is set at a slightly lower rotation speed than an upper limit value Nmax of a rotation speed region of the input shaft 36 in which over-rotation does not occur in the rotary elements of the transmission 30. The threshold Nref3 is set at an intermediate value, which is higher than the threshold Nref1 and lower than the threshold Nref2. The reasons for providing the threshold Nref2 and the threshold Nref3 will be described below.

$$Nref1 = \gamma set \times [[']] Nout + Na \qquad (1)$$

$$Nref2 = \gamma set \times [[']] Nout + Nb \qquad (2)$$

$$Nref3 = \gamma set \times [[']] Nout + Nc \qquad (3)$$

Once thresholds Nref1, Nref2 and Nref3 have been calculated, turbine rotation speed Ntur is compared to threshold Nref1 (S220), and when the turbine rotation speed Ntur is lower than the threshold Nref1, it is determined that an abnormality has not occurred in the transmission 30. Hence, the routine is terminated without performing any further processing. When the turbine rotation speed Ntur is equal to or higher than the threshold Nref1, the timer 58 is used to determine whether or not this state has continued for a predetermined time period Ta (S230). Here, the predetermined time period Ta is a time period for confirming that an abnormality has occurred in the transmission 30, and is set at, for example, 500 msec. When it is determined that the turbine rotation speed Ntur has been equal to or higher than the threshold Nref1 for the predetermined time period Ta or longer, the existence of an abnormality in the transmission 30 is confirmed (S240), whereupon the routine is terminated. When the existence of an abnormality in the transmission 30 is confirmed in this manner, the abnormality determination flag Fa is set at a value of 1, whereupon shifts to the shift speed that has been rendered unusable due to the abnormality are prohibited, and travel is performed using only the usable shift speeds. For example, a shift using only the usable shift speeds may be performed by setting a shift map, which is created in advance, using only the usable shift speeds in operation S120 of the operation control routine illustrated in FIG. 4, and setting the target shift speed n* on the basis of this shift map.

On the other hand, when the turbine rotation speed Ntur is equal to or higher than the threshold Nref1 but this state has not continued for the predetermined time period Ta or longer, the turbine rotation speed Ntur is compared to the threshold Nref2 (S250). When the turbine rotation speed Ntur is equal to or higher than the threshold Nref2, the timer 58 is used to determine whether or not this state has continued for a predetermined time period Tb or longer (S260). Here, the predetermined time period Tb is a time period for determining the possibility of over-rotation in the rotary elements of the transmission 30, and is set, for example, at 30 msec. When it is determined that the turbine rotation speed Ntur has been equal to or higher than the threshold Nref2 for the predetermined time period Tb or longer, the output limitation flag Felim of engine 22 is set at a value of 1 (S270), whereupon the routine is terminated. When the output limitation flag Felim is set at a value of 1, the value obtained by limiting the target throttle opening TH* to the limit value THlim in the operation control routine of FIG. 4 is set as the execution throttle opening TH, and the torque from the engine 22 is limited accordingly. As a result, increased rotation of the input shaft 36 of the transmission 30 is eliminated, and over-rotation does not occur in the rotary elements of the transmission 30. When it is determined that the turbine rotation speed Ntur is equal to or higher than the threshold Nref2, but that this state has not continued for the predetermined time period Tb or longer, the routine is terminated without performing any further processing.

In this exemplary embodiment, when it is determined that the turbine rotation speed Ntur is lower than the threshold Nref2, the turbine rotation speed Ntur is compared to the threshold Nref3 (S280), and when the turbine rotation speed Ntur is equal to or higher than the threshold Nref3, the routine is terminated without modifying the output limitation flag Felim. However, when turbine rotation speed Ntur is lower than the threshold Nref3, the output limitation flag Felim is set at a value of 0 (S290), whereupon the routine is terminated. In so doing, the limitation on the torque from the engine 22 is released, and as long as the driver does not re-press the accelerator pedal 63, rotation speed of the input shaft 36 of the transmission 30 (the turbine rotation speed Ntur) rises again. Here, when the turbine rotation speed Ntur has been equal to or higher than the threshold Nref2 continuously for predetermined time period Tb, the output limitation flag Felim is set at a value of 1 again, whereby the torque from the engine 22 is limited. By limiting the torque from the engine 22 and the releasing the limitation thereon repeatedly using the threshold Nref2 and the threshold Nref3 such that the turbine rotation speed Ntur fluctuates between the threshold Nref1 and the upper limit value Nmax, enough time is secured to determine whether an abnormality exists in the actuator of the hydraulic circuit 40 on the basis of the turbine rotation speed Ntur, and therefore erroneous abnormality determinations are prevented and the turbine rotation speed Ntur is prevented from exceeding the upper limit value Nmax.

Figure 6:
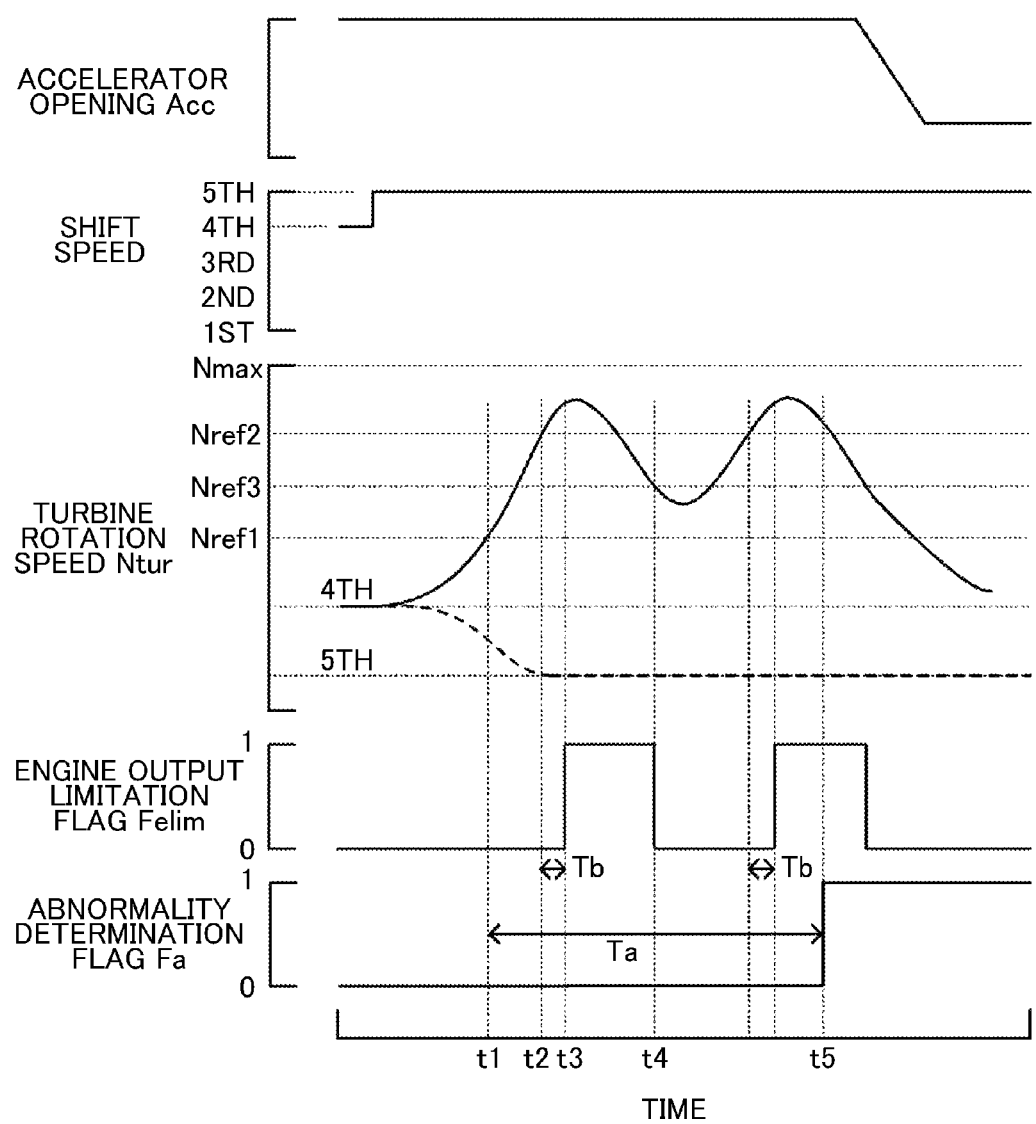
FIG. 6 is an illustrative view showing temporal variation in an accelerator opening Acc, a shift speed of the transmission 30, a turbine rotation speed Ntur, an output limitation flag Felim of an engine 22, and an abnormality determination flag Fa of the transmission 30 in accordance with one exemplary embodiment of the present invention.

FIG. 6 shows an exemplary embodiment of a temporal variation in the accelerator opening Acc, the shift speed of the transmission 30, the turbine rotation speed Ntur, the output limitation flag Felim of the engine 22, and the abnormality determination flag Fa of the transmission 30. As shown in FIG. 6, when an abnormality occurs in the actuator of the hydraulic circuit 40 during a shift from the fourth forward speed to the fifth forward speed while traveling such that the turbine rotation speed Ntur reaches or exceeds the threshold Nref1 at a time t1 and reaches or exceeds the threshold Nref2 at a time t2, whereupon this state continues for the predetermined time period Tb (time t3), the output limitation flag Felim of the engine 22 is set at a value of 1 to limit the torque from the engine 22. As a result, the turbine rotation speed Ntur decreases. When the turbine rotation speed Ntur falls below the threshold Nref3 at a time t4, the output limitation flag Felim is set at a value of 0 again, and as a result, the limitation on the torque from the engine 22 is released such that the turbine rotation speed Ntur rises. When a state in which the turbine rotation speed Ntur is equal to or higher than the threshold Nref1 continues for the predetermined time period Ta while limiting the torque of the engine 22 and releasing the limitation repeatedly in this manner (time t5), the existence of an abnormality in the transmission 30 is confirmed. Note that FIG. 6 shows a case in which a shift is performed from the fourth forward speed to the fifth forward speed during travel, but similar processing may be performed during a shift from the fifth forward speed to the fourth forward speed.

According to the automobile 20 of the exemplary embodiment described above, when the turbine rotation speed Ntur reaches or exceeds the threshold Nref1 for determining the existence of an abnormality in the actuator of the hydraulic circuit 40 that drives the transmission 30 and then reaches or exceeds the threshold Nref2, which is lower than the upper limit value Nmax of the rotation speed region of the input shaft 36 in which over-rotation does not occur in the rotary elements of the transmission 30, the output limitation flag Felim is set at a value of 1 such that limitation of the torque from the engine 22 begins. When the turbine rotation speed Ntur falls below the threshold Nref3, which is larger than the threshold Nref1 and smaller than the threshold Nref2, the limitation on the torque of the engine 22 is released, and when a state in which the turbine rotation speed Ntur is equal to or higher than the threshold Nref1 continues for the predetermined time period Ta, the existence of an abnormality in the actuator of the hydraulic circuit 40 is confirmed. Thus, enough time is secured to determine the existence of an abnormality in the actuator of the hydraulic circuit 40 on the basis of the turbine rotation speed Ntur, and therefore erroneous abnormality determinations can be prevented and the turbine rotation speed Ntur can be prevented from exceeding the upper limit value Nmax.

In the automobile 20 of this exemplary embodiment, the torque of the engine 22 is limited when a state in which the turbine rotation speed Ntur is equal to or higher than the threshold Nref2 continues for the predetermined time period Tb, but the torque of the engine 22 may be limited as soon as the turbine rotation speed Ntur reaches or exceeds the threshold Nref2.

In the automobile 20 of this exemplary embodiment, torque from the engine 22 is limited using the predetermined limit value THlim when the turbine rotation speed Ntur reaches or exceeds the threshold Nref2, and the limitation on the torque of the engine 22 is released when the turbine rotation speed Ntur falls below the threshold Nref3. However, the present invention is not limited thereto, and as long as the limit value is set within a range of the turbine rotation speed Ntur that is equal to or higher than the threshold Nref1 and lower than the upper limit value Nmax, a throttle opening that corresponds to the torque required to maintain a predetermined rotation speed, for example, may be set as the limit value THlim.

Figure 5:
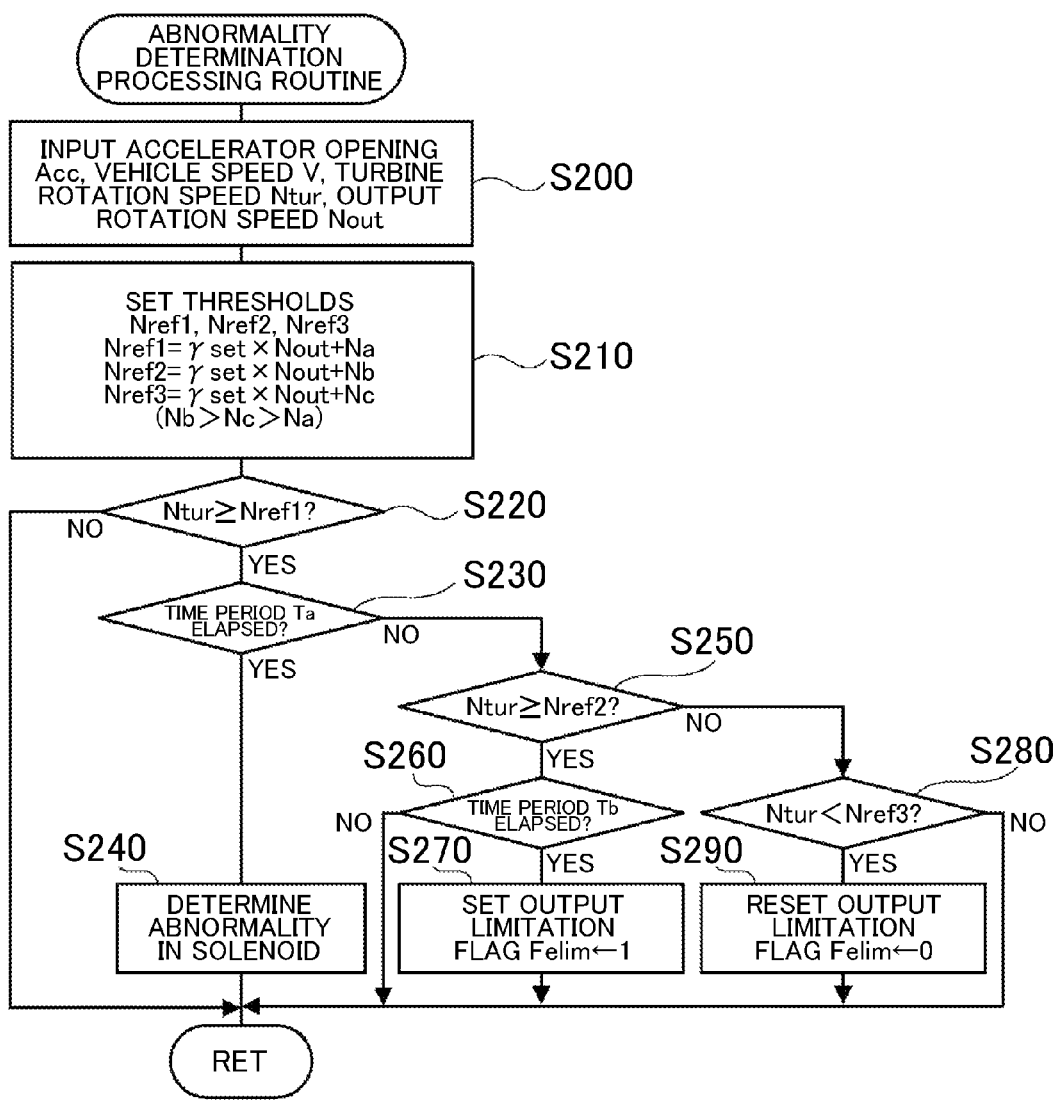
FIG. 5 is a flowchart showing an example of an abnormality determination processing routine executed by the vehicle electronic control unit 50.

In the automobile 20 of this exemplary embodiment, the abnormality determination processing routine of FIG. 5 is used as processing when shifting between the fourth speed and the fifth speed, but also may be used as processing when shifting between other shift speeds, depending on the specifications of the transmission.

In the automobile 20 of this exemplary embodiment, a five-speed hydraulically driven stepped transmission is used as the transmission 30, but as long as a stepped transmission is used, the number of shift speeds is not limited to five, and a stepped transmission having any number of shift speeds, such as, for example, four or six, may be used.

It is contemplated that numerous modifications may be made to the exemplary embodiments of the invention without departing from the spirit and scope of the embodiments of the present invention as defined in the following claims.

What is claimed is:

1. A vehicle comprising:
   an internal combustion engine including an output shaft;
   a stepped transmission comprising an input shaft connected to the output shaft of the internal combustion engine and an output shaft connected to an axle side, wherein the stepped transmission speed-changes power input to the input shaft while changing a shift speed and outputs the speed-changed power to the stepped transmission output shaft;
   a control unit that controls the internal combustion engine and the stepped transmission in accordance with an output request from an operator;
   an input shaft rotation speed detecting unit that detects an input shaft rotation speed;
   an output shaft rotation speed detecting unit that detects an output shaft rotation speed;
   an output limiting unit which, when a rotation speed relationship between the detected input shaft rotation speed and the detected output shaft rotation speed exceeds a range of a predetermined rotation speed relationship for determining an abnormality in the stepped transmission, limits an output of the internal combustion engine relative to the output request to a range in which the rotation speed relationship exceeds the range of the predetermined rotation speed relationship and the rotation speed of the input shaft does not exceed a predetermined upper limit rotation speed; and
   an abnormality determining unit to determine that an abnormality has occurred in the stepped transmission when the rotation speed relationship exceeds the range of the predetermined rotation speed relationship for at least a first predetermined time period, while limiting the torque of the engine and releasing the limitation repeatedly.

2. The vehicle according to claim 1, wherein the abnormality determining unit determines that an abnormality occurred in an actuator that drives the stepped transmission.

3. The vehicle according to claim 1, wherein
   the output limiting unit sets an upper torque limit for the internal combustion engine, and
   the control unit controls the internal combustion engine such that a requested torque serving as the output request of the operator is output from the internal combustion engine within a range of the set upper torque limit.

4. The vehicle according to claim 3, wherein the abnormality determining unit determines that an abnormality occurred in an actuator that drives the stepped transmission.

5. The vehicle according to claim 1, wherein
   the output limiting unit begins to limit an output of the internal combustion engine when a deviation between the detected input shaft rotation speed and a value obtained by multiplying a reduction ratio of a subject shift speed by the detected output shaft rotation speed, having reached or exceeded a first predetermined value, reaches or exceeds a second predetermined value that is greater than the first predetermined value, and stops limiting the output of the internal combustion engine when the deviation falls below a third predetermined value that is smaller than the second predetermined value and larger than the first predetermined value, and the abnormality determining unit determines that an abnormality has occurred in the stepped transmission when the deviation is equal to or greater than the first predetermined value for at least the first predetermined time period.

6. The vehicle according to claim 5, wherein the output limiting unit begins to limit the output of the internal combustion engine when the deviation remains equal to or greater than the second predetermined value for at least a second predetermined time period, wherein the second predetermined the period is shorter than the first predetermined time period.

7. The vehicle according to claim 6, wherein
the output limiting unit sets an upper torque limit for the internal combustion engine, and
the control unit controls the internal combustion engine such that a requested torque serving as the output request of the operator is output from the internal combustion engine within a range of the set upper torque limit.

8. The vehicle according to claim 7, wherein the abnormality determining unit determines that an abnormality occurred in an actuator that drives the stepped transmission.

9. The vehicle according to claim 6, wherein the abnormality determining unit determines that an abnormality occurred in an actuator that drives the stepped transmission.

10. The vehicle according to claim 5, wherein
the output limiting unit sets an upper torque limit for the internal combustion engine, and
the control unit controls the internal combustion engine such that a requested torque serving as the output request of the operator is output from the internal combustion engine within a range of the set upper torque limit.

11. The vehicle according to claim 10, wherein the abnormality determining unit determines that an abnormality occurred in an actuator that drives the stepped transmission.

12. The vehicle according to claim 5, wherein the abnormality determining unit determines that an abnormality occurred in an actuator that drives the stepped transmission.

13. A control method for a vehicle having an internal combustion engine, the internal combustion engine including an output shaft, and a stepped transmission that has an input shaft connected to the output shaft of the internal combustion engine and an output shaft connected to an axle side, wherein the stepped transmission speed-changes a power input to the input shaft while changing a shift speed and outputs the speed-changed power to the stepped transmission output shaft, in which the internal combustion engine and the stepped transmission are controlled in accordance with an output request from an operator, the control method comprising:

when a rotation speed relationship between an input shaft rotation speed and an output shaft rotation speed exceeds a range of a predetermined rotation speed relationship for determining an abnormality in the stepped transmission, output of the internal combustion engine is limited relative to the output request to a range in which the rotation speed relationship exceeds the range of the predetermined rotation speed relationship and the input shaft rotation speed does not exceed a predetermined upper limit rotation speed; and determining that an abnormality has occurred in the stepped transmission when the rotation speed relationship exceeds the range of the predetermined rotation speed relationship for at least a first predetermined time period, while limiting the torque of the engine and releasing the limitation repeatedly.

* * * * *